United States Patent
Abdul-Razzak

(10) Patent No.: US 9,946,313 B2
(45) Date of Patent: Apr. 17, 2018

(54) PERIPHERAL CARD HOLDER FOR AN INFORMATION HANDLING SYSTEM

(71) Applicant: DELL PRODUCTS, LP, Round Rock, TX (US)

(72) Inventor: Neda Abdul-Razzak, Pflugerville, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 0 days.

(21) Appl. No.: 15/165,601

(22) Filed: May 26, 2016

(65) Prior Publication Data
US 2017/0344078 A1    Nov. 30, 2017

(51) Int. Cl.
G06F 1/16     (2006.01)
H05K 7/02     (2006.01)
G06F 1/18     (2006.01)
G06F 1/20     (2006.01)

(52) U.S. Cl.
CPC ............. G06F 1/185 (2013.01); G06F 1/20 (2013.01)

(58) Field of Classification Search
CPC ............. G06F 1/185; G06F 1/183; G06F 1/20
USPC ........... 361/679.32, 737, 740, 807, 810, 695
See application file for complete search history.

(56) References Cited

U.S. PATENT DOCUMENTS

| | | | |
|---|---|---|---|
| 5,642,264 A * | 6/1997 | Cantrell | H05K 7/1425 361/756 |
| 8,315,067 B2 * | 11/2012 | Chen | G06F 1/186 361/679.32 |
| 8,693,208 B2 | 4/2014 | Reinke et al. | |
| 8,804,343 B2 * | 8/2014 | Fan | G06F 1/186 361/737 |
| 2005/0013125 A1 * | 1/2005 | Dobbs | G06F 1/184 361/801 |
| 2009/0269945 A1 * | 10/2009 | Tzeng | G06F 1/185 439/61 |
| 2010/0271769 A1 * | 10/2010 | Rema Shanmugam | H04M 1/0237 361/679.05 |
| 2012/0131253 A1 | 5/2012 | McKnight et al. | |
| 2012/0155007 A1 * | 6/2012 | Zhang | H05K 5/0269 361/679.32 |
| 2012/0275849 A1 * | 11/2012 | Fu | G06F 1/185 403/287 |
| 2013/0027891 A1 * | 1/2013 | Fan | G06F 1/186 361/748 |
| 2013/0148286 A1 * | 6/2013 | Liu | G06F 1/185 361/679.32 |
| 2014/0156897 A1 | 6/2014 | Reinke et al. | |
| 2014/0365714 A1 | 12/2014 | Sweere et al. | |
| 2015/0029659 A1 * | 1/2015 | Shao | G06F 1/20 361/679.51 |
| 2015/0286602 A1 | 10/2015 | Buckland et al. | |
| 2016/0070661 A1 | 3/2016 | Huang et al. | |
| 2016/0117279 A1 | 4/2016 | Borikar | |

* cited by examiner

Primary Examiner — Nidhi Thaker
(74) Attorney, Agent, or Firm — Larson Newman, LLP

(57) ABSTRACT

A peripheral card for an information handling system mounts to an end of a chassis. The peripheral card has an opposite end secured to a base. The base has switchable features for accommodating different types of peripheral cards that may be installed in the chassis.

18 Claims, 17 Drawing Sheets

PERIPHERAL CARD HOLDER FOR AN INFORMATION HANDLING SYSTEM

FIELD OF THE DISCLOSURE

The present disclosure generally relates to information handling systems, and more particularly relates to a peripheral card holder for an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A peripheral card for an information handling system mounts to an end of a chassis. The peripheral card has an opposite end secured to a base. The base has switchable features for accommodating different types of peripheral cards that may be installed in the chassis.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
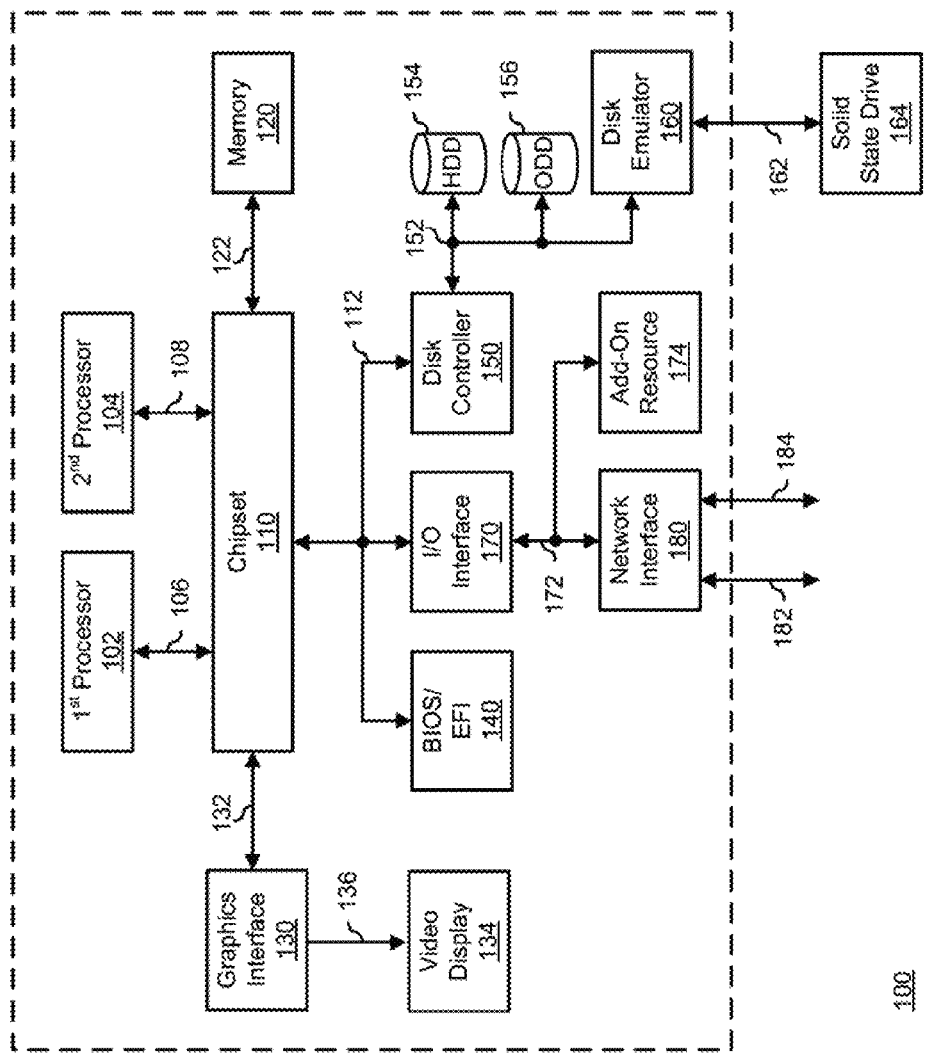
FIG. 1 is a block diagram illustrating an information handling system according to an embodiment of the present disclosure.

FIG. 1 illustrates a generalized embodiment of information handling system 100, according to exemplary embodiments. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources.

Disk controller 150 includes a disk interface 152 that connects the disc controller 150 to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
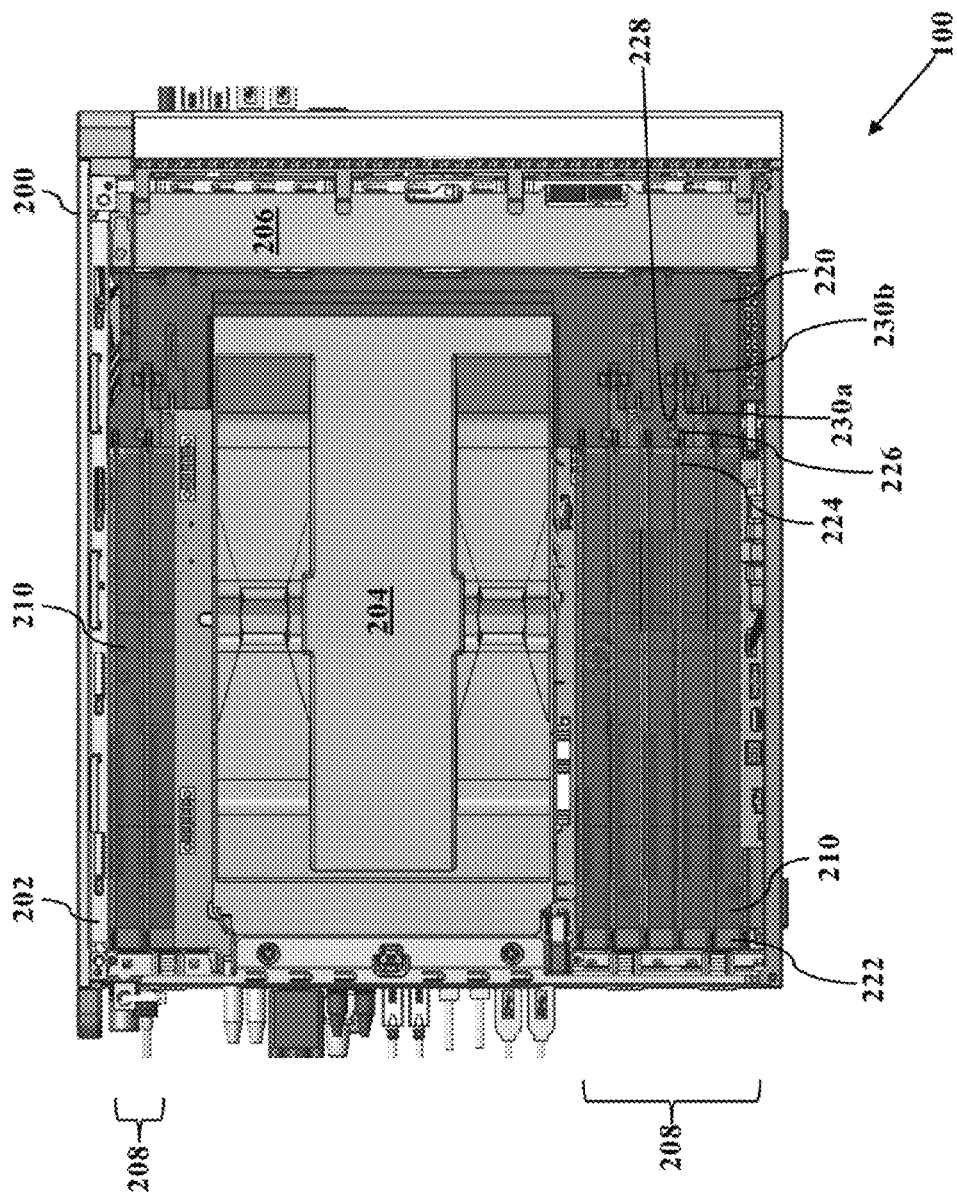
FIG. 2 is another illustration of the information handling system, according to exemplary embodiments.

FIG. 2 shows the information handling system 100 having an outer panel or cover that has been removed to reveal internal componentry. The information handling system 100 has an outer enclosure or cabinet 200 that houses the internal componentry mounted to a chassis 202. One or more removable shrouds (such as 204 and 206) may obscure some of the internal componentry (such as the processors 102 and 104 and the memory 120, as described with reference to FIG. 1). These shrouds 204 and 206 may also function as a cooling system, as will be later explained. As FIG. 2 illustrates, the information handling system 100 may have dedicated spaces 208, or slots, for one or more peripheral cards 210. The peripheral cards 210 may be examples of the peripheral interface 172 that connects the I/O interface to the add-on resource 174 (as illustrated with reference to FIG. 1). The peripheral cards 210 may connect to, or interface with, the chipset 110 (perhaps covered by the shroud 204 and also illustrated in FIG. 1). The peripheral cards 210 provide input and/or output expansion functions. Peripheral cards are generally well known, so the functional and operational details need not be explained. Indeed, there are many different peripheral cards 210 for many different functions and devices, and the peripheral cards 210 may have different designs by different vendors.

A base 220 is a bracket or mounting structure that helps retain or hold the peripheral cards 210 within the chassis 202. Because there may be so many different configurations and designs of the peripheral cards 210, the base 220 includes features for securing the many different peripheral cards 210. The base 220, in other words, allows the information handling system 100 to simply and quickly accommodate many different configurations of the peripheral cards 210. As FIG. 2 illustrates, each one of the peripheral cards 210 generally has a bracket end 222 that secures to the chassis 202 and/or to the cabinet 200. Each one of the peripheral cards 210 also has an opposite end 224 that is retained by the base 220. That is, an edge 226 of the peripheral card 210 inserts within, or slides into, a switchable insert 228. The insert 228 has features that are sized (such as width, depth, and/or length) to accept the edge 226 of the peripheral card 210.

FIG. 2 thus illustrates a simple example. Here the insert 228 may have different installation positions 230 within the base 220. Each one of the different installation positions 230 accommodates a different configuration of the corresponding peripheral card 210. FIG. 2, for simplicity, illustrates two different installation positions 230. That is, the insert 228 may have a first installation position 230a that accommodates a first configuration of the peripheral card 210. However, the insert 228 may have a second installation position 230b that accommodates a second configuration of the peripheral card 210. So, as the peripheral card 210 is installed within the chassis 202, an installer may select and move the insert 228 to the installed position (such as 230a or 230b) that best suits the dimensions and/or configuration of the peripheral card 210.

The insert 228 is thus dynamically switchable. Conventional retention systems statically support a single configuration of a peripheral card. Here, though, the insert 228 is movable to accommodate different dimensions and/or configurations of different peripheral cards 210. Again, there are many different designs of the peripheral cards 210 offered by many different vendors. Exemplary embodiments thus allow the base 220 to accommodate many different peripheral cards, regardless of their different physical dimensions and configurations. Moreover, exemplary embodiments also improve airflow and convective cooling, as later paragraphs will explain.

Figure 3:
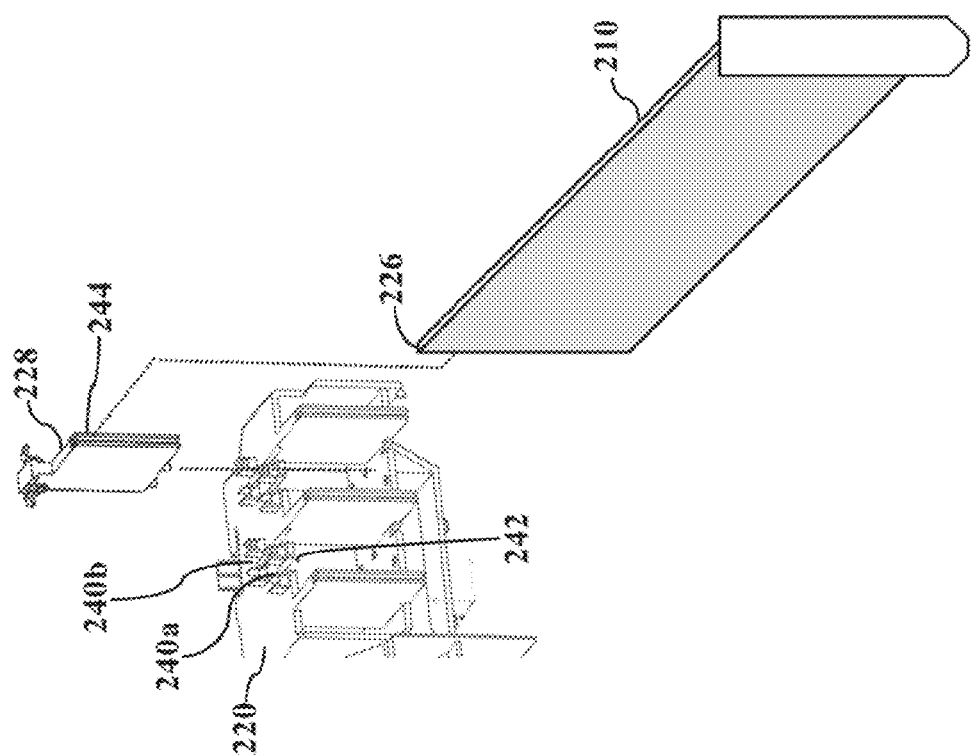
FIG. 3 is an exploded perspective view of a retention mechanism, according to exemplary embodiments.

FIG. 3 shows the base 220 that may have different notches 240 sized to accept the insert 228. Again, for simplicity, FIG. 3 only illustrates two different notches 240a and 240b. The base 220, however, may have any number of notches 240, perhaps depending on the number of possible configurations for the peripheral card 210. The different notches 240a and 240b may have different positions, depths, heights, thicknesses, and other features to accommodate different peripheral cards 210. The insert 228 may thus slide down into an open end 242 of the notch 240 that corresponds to the dimensions and/or configuration of the peripheral card 210. Once the insert 228 is installed in the appropriate notch (such as 240a or 240b), the edge 226 of the peripheral card 210 may then insert into a channel 244 in the insert 228. The different notches 240 in the base 220 may be sized (such as width, depth, and/or length) to accept the insert 228. The different notches 240 may also be insulative and thus non-conducting electricity, thus reducing a possibility of electrical shock, charge, or damage to the peripheral card 210. The appropriate one of the notches (such as 240a or 240b) thus allows the channel 244 in the insert 228 to align with the peripheral card 210.

Figure 4:
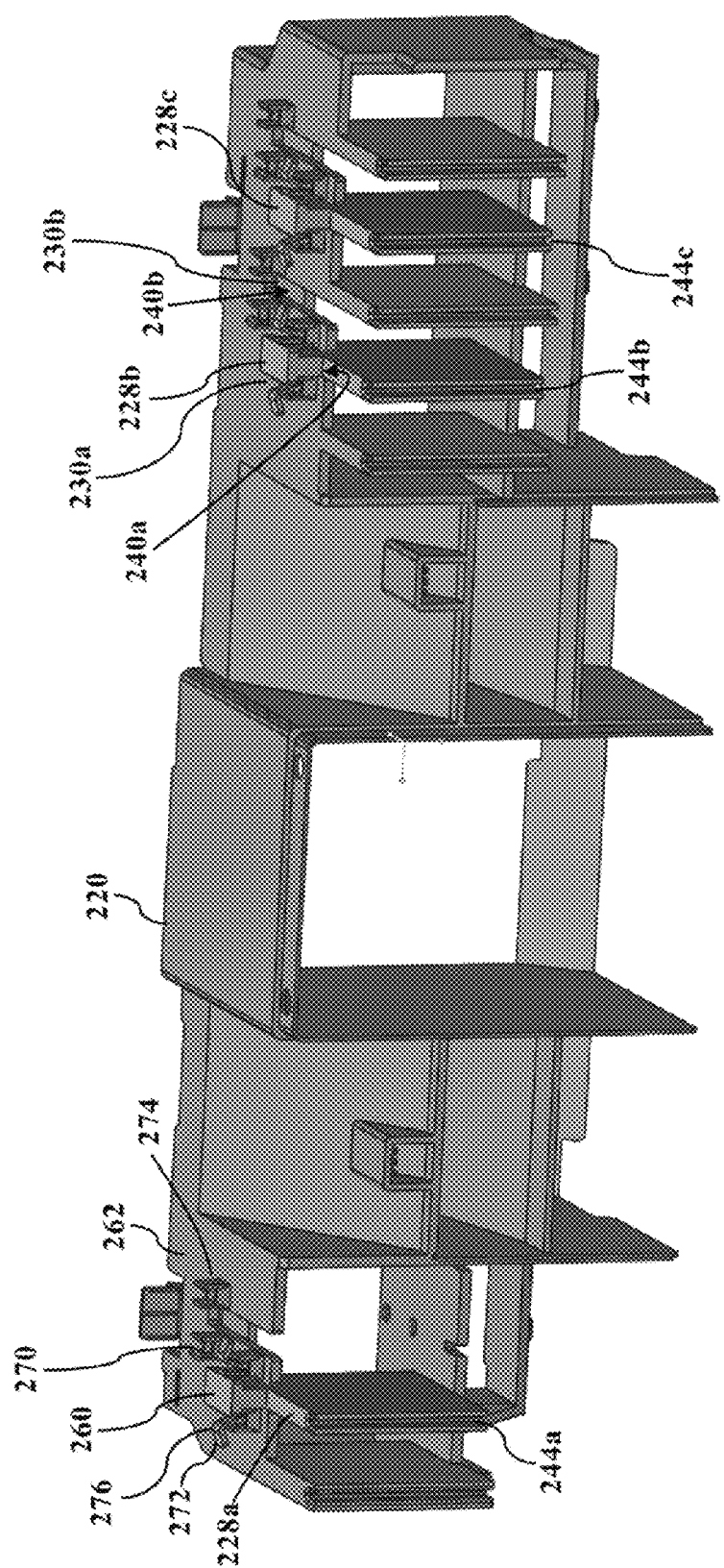
FIGS. 4-5 illustrate a base, according to exemplary embodiments.
Figure 5:
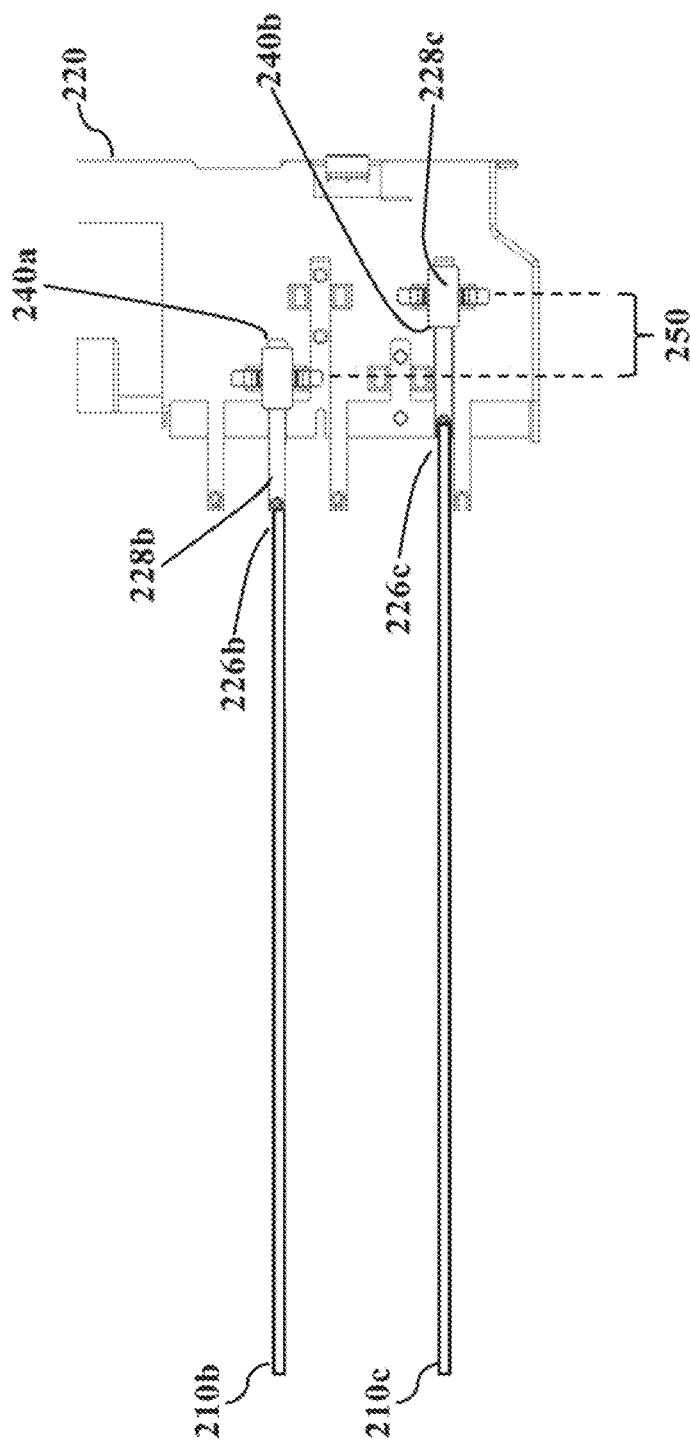

FIGS. 4-5 are more illustrations of the base 220, according to exemplary embodiments. FIG. 4 is an isometric view, while FIG. 5 is a top view. The base 220 secures to the chassis 202 (illustrated in FIG. 2) and may have any dimensions to suit any packaging or performance objective. FIG. 4 illustrates the base 220 configured to retain several peripheral cards (as FIG. 2 illustrated). The base 220, for example, has several different removable inserts (such as 228a, 228b, and 228c). Each insert 228 has the corresponding channel (such as 244a, 244b, and 244c) for accommodating the edge 226 of a corresponding peripheral card 210 (as FIG. 3 best illustrated). Each insert (such as 228b) thus has the different installation positions 230a or 230b via the respective notches 240a and 240b. The first notch 240a corresponds to the first installation position 230a, while the second notch 240b corresponds to the second installation position 230b.

The insert 228b is inserted into its corresponding notch 240a, thus supporting the edge 226b of the corresponding peripheral card 210b. The neighboring insert 228c, though, is inserted into its corresponding notch 240b to support the edge 226b of the corresponding peripheral card 210c. FIG. 5 thus illustrates the constant offset 250 defining the two different positions. That is, the notch 240b is displaced in depth within the base 220 from the first notch 240a. The installer may thus switch the installation positions of the insert 228b to accommodate its peripheral card 210b. The insert 228c, likewise, may be switched between its corresponding notches 240 to accommodate its corresponding peripheral card 210c. Each insert 228 may thus have its own offset 250 between its corresponding notches 240.

Returning to FIG. 4, the insert (such 228a) may also have a grasp tab 260. The grasp tab 260 upwardly extends from a rectangular body of the insert 228. The grasp tab 260 protrudes beyond a deck 262 or surface of the base 220, thus allowing a human or machine installer to lift and place insert 228a for installation or removal (such as the first notch 240a or the second notch 240b). The installer may thus switch the insert 228a from the first installation position 230a to the second installation position 230b to accommodate different peripheral cards.

FIG. 4 also illustrates a locking mechanism 270. When the insert (such as 228a) is dropped into place (such as either notch 240a or 240b), the locking mechanism 270 secures the insert 228a to reduce, or even prevent, unintended movement or removal. The locking mechanism 270, for example, may have one or more pinch tabs 272. Each pinch tab 272 may upwardly extend from the rectangular body of the insert 228a. Each pinch tab 272 may releasably engage a mating lock 274 to secure the insert 228a to the base 220. Each pinch tab 272 may thus be flexibly or pliantly moved out of engagement, thus allowing the insert 228a to be removed from the base 220. While FIG. 4 illustrates a pair 276 of the pinch tabs 272, more or less pinch tabs 272 may be used.

Figure 6:
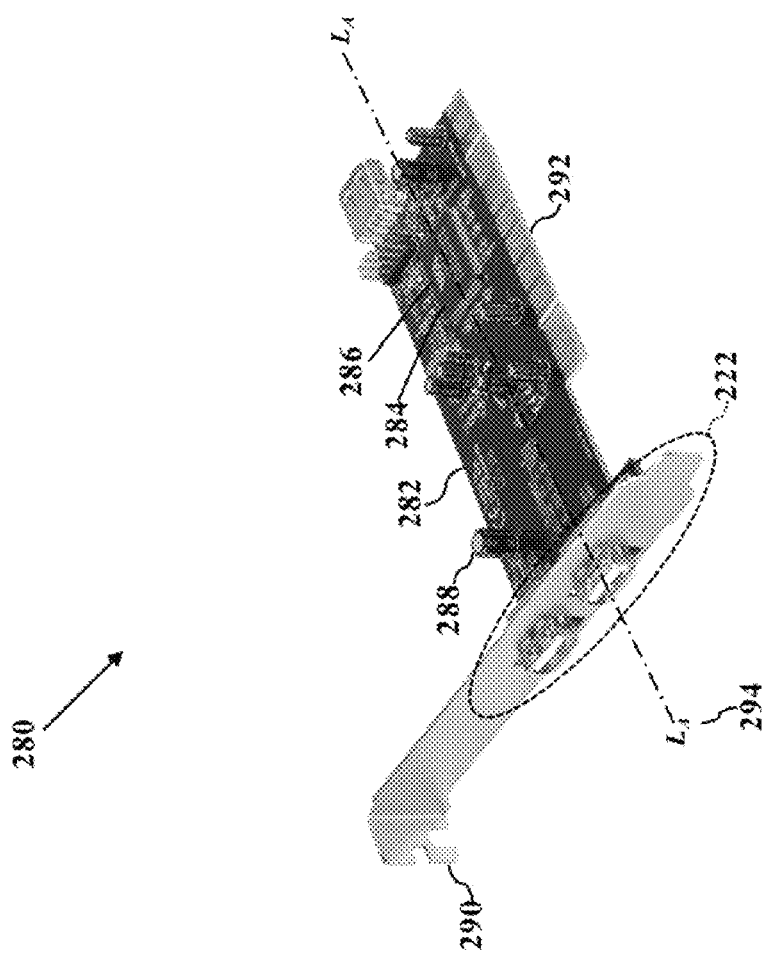
FIGS. 6-7 further illustrate different peripheral cards, according to exemplary embodiments.
Figure 7:
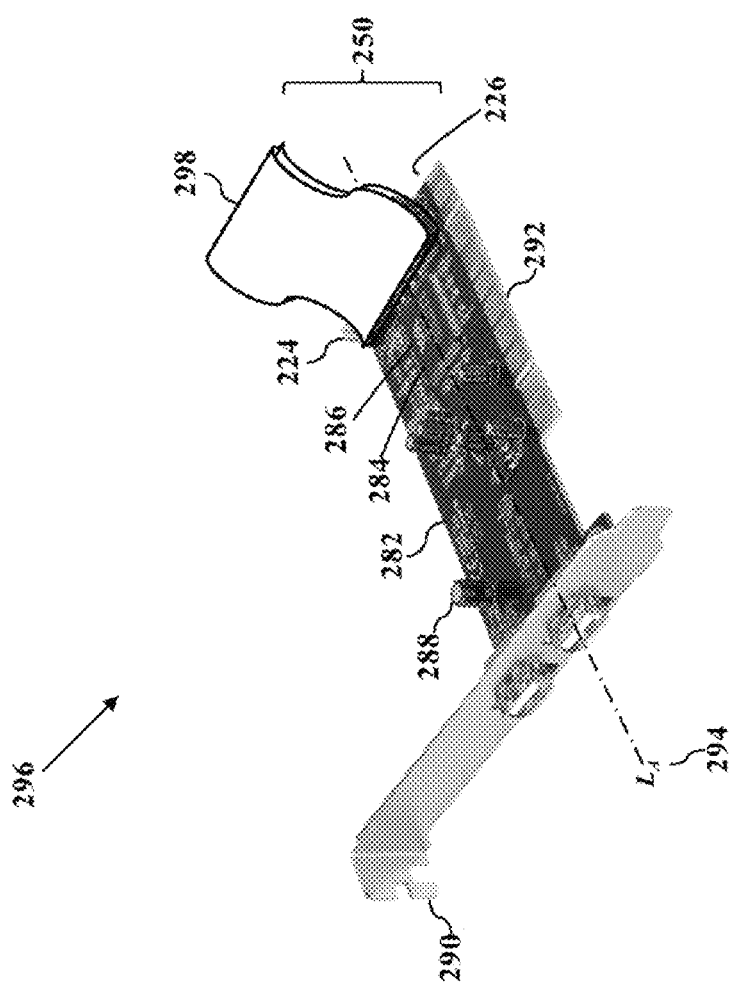

FIGS. 6-7 further illustrate the different peripheral cards 210, according to exemplary embodiments. This disclosure explains how exemplary embodiments accommodate many different dimensions and configurations of peripheral cards. As an example, there are many different peripheral component interconnect (or "PCI") cards available for installation in the chassis 200 (illustrated in FIG. 1). Indeed, a server may have several PCI cards installed within the chassis 200, and the PCI cards may have different lengths and supports. For example, FIG. 6 illustrates a so-called "straight" PCI card 280. The PCI card 280 has a printed circuit board 282 with various electronic components, such as an on-board processor 284, memory device 286, and capacitors 288. The peripheral card 210 has a mounting bracket 290 at the bracket end 222 that secures to the chassis 202 (as earlier explained with reference to FIG. 2). The PCI card 280 has a male conductive blade 292 that inserts into a female connecting slot (not shown). The printed circuit board 282 thus defines a longitudinal axis $L_A$-$L_A$ (illustrated as reference numeral 294).

FIG. 7, though, illustrates a so-called "offset" PCI card 296. Here the offset PCI card 296 has an additional support bracket 298 at the opposite end 224. The support bracket 298 may have the offset 250 from the edge 226 of the printed circuit board 282. Exemplary embodiments thus allow the base 220 to accommodate both the straight PCI card 280 and the offset PCI card 296 by merely switching the installed position of the insert 228 (as FIGS. 2-5 illustrate).

Figure 8:
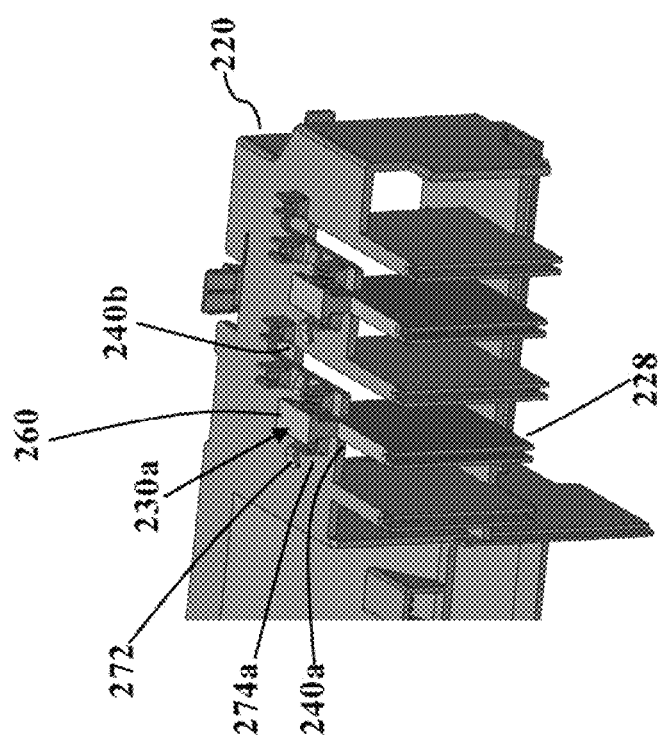
FIGS. 8-13 illustrate different installation positions, according to exemplary embodiments.
Figure 9:
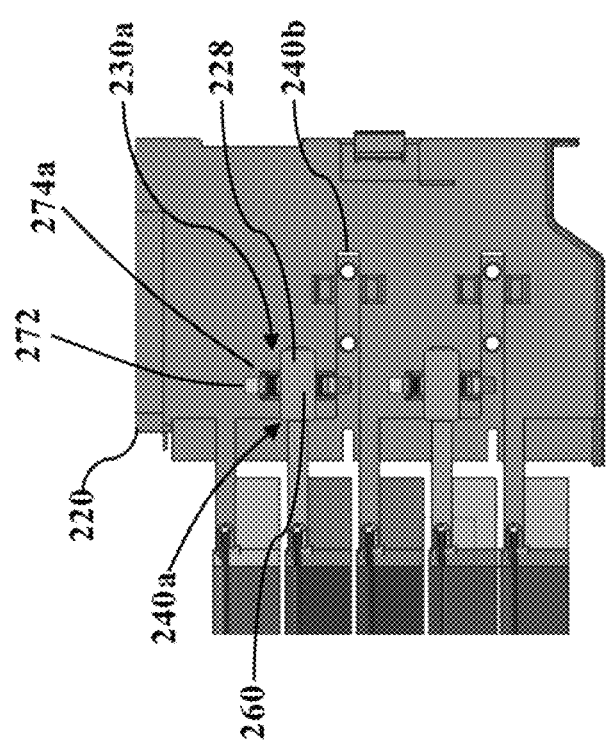
Figure 10:
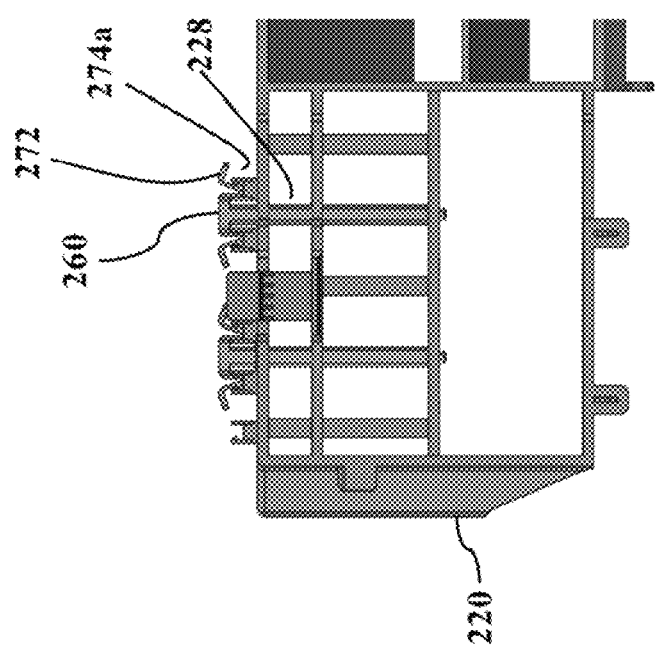
Figure 11:
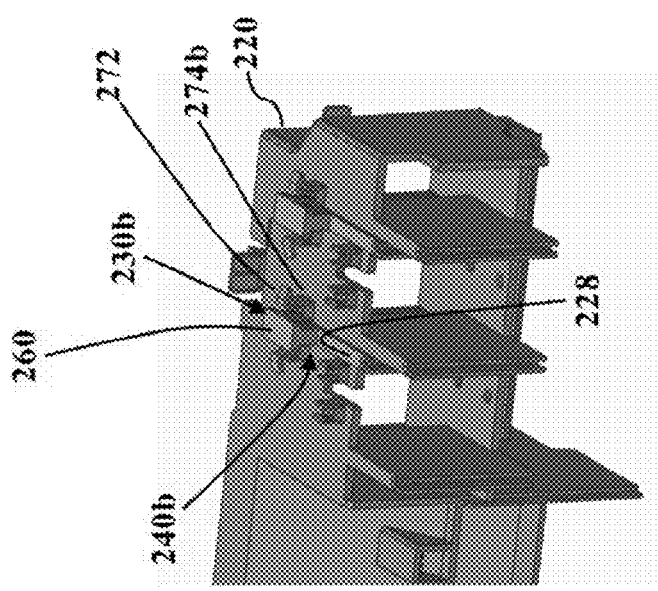
Figure 12:
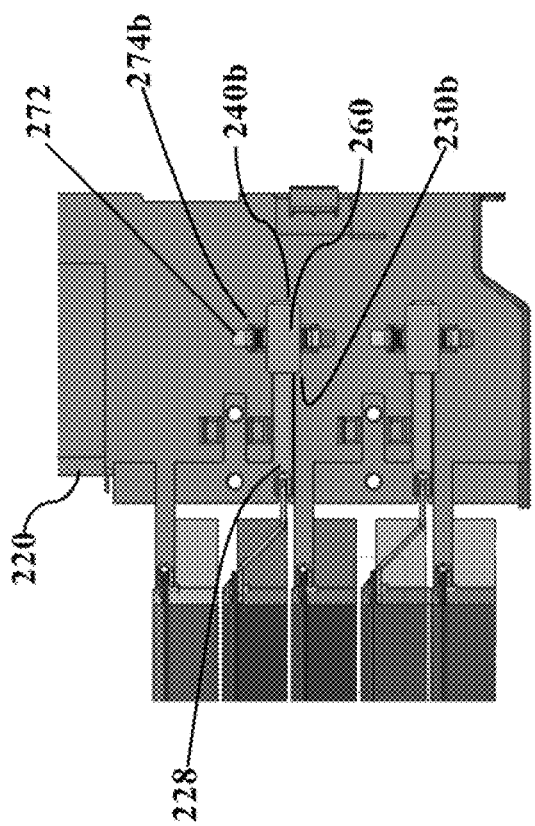
Figure 13:
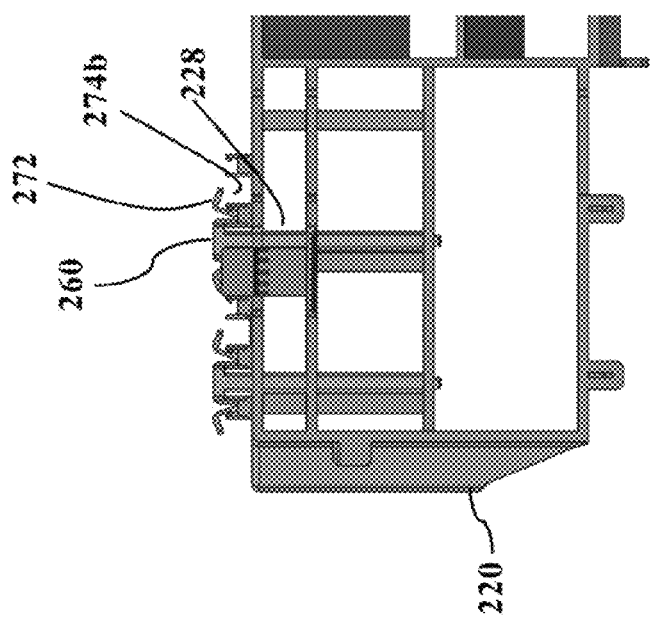

FIGS. 8-13 further illustrate the different installation positions 230a and 230b, according to exemplary embodiments. FIGS. 8-10 illustrate the first installation position 230a for "straight" peripheral cards (as illustrated in FIG. 6), while FIGS. 11-13 illustrate the second installation position 230b for "offset" peripheral cards (as illustrated in FIG. 7). FIG. 8 is an isometric view of the insert 228 installed in the base 220, while FIGS. 9-10 are, respectively, top and rear views of the insert 228 installed in the base 220. FIGS. 8-10 illustrates the two different notches 240a and 240b, with the insert 228 slid into the first notch 240a. As the insert 228 is downwardly slid into the notch 240a (perhaps via depression of the grasp tab 260), each pinch tab 272 engages its respective lock 274a, thus locking the insert 228 into the notch 240a.

FIGS. 11-13 illustrate the second installation position 230b. Here exemplary embodiments are configured for installation of "offset" peripheral cards (as illustrated in FIG. 7). FIG. 11 is an isometric view of the insert 228 installed in the base 220, while FIGS. 12-13 are, respectively, top and rear views of the insert 228 installed in the base 220. FIG. 11 illustrates the insert 228 slid into the second notch 240b. As the insert 228 is downwardly slid into the notch 240b (perhaps via depression of the grasp tab 260), the pinch tab 272 engages its respective lock 274b, thus locking the insert 228 into the notch 240b.

Exemplary embodiments thus simply and quickly accommodate peripheral cards. The notches 240a and 240b in the base 220 accommodate the different installation positions 230a and 230b for "straight" peripheral cards and "offset" peripheral cards (as illustrated in FIGS. 6-7). An installer need only grasp the insert 228 (perhaps via the grasp tab 260) and snap the insert 228 in the appropriate notch 240a or 240b. The notches 240a and 240b may thus be configured to suit or match the dimensions and configurations of the "straight" peripheral cards and the "offset" peripheral cards. The installer may thus dynamically switch the insert 228 to suit the particular peripheral card being installed.

Exemplary embodiments may accommodate many different peripheral cards. FIGS. 2-13 only illustrate the two different installation positions (such as 230a and 230b). That is, exemplary embodiments have been explained with reference to only the two different notches 240a and 240b. The reader, however, may now realize that the base 220 may have several, or even many, different notches 240. Each different notch 240 may be configured for the dimensions and configuration of a particular peripheral card. If, for example, the information handling system 100 may be tested and validated for five different peripheral cards having five different geometries, the base 220 may thus have five different notches 240. Each different notch 240 may thus be configured in width, depth, and position to match the physical dimensions of one of the peripheral cards. The single base 220, in other words, may secure many different peripheral cards, regardless of their physical dimensions and/or supporting mechanisms.

FIGS. 14-17 illustrate cooling enhancements, according to exemplary embodiments. Even though the switchable or adjustable insert 228 accommodates many different peripheral cards, exemplary embodiments also flow more cooling air across the peripheral card 210. FIG. 14, for example, again illustrates the internal componentry of the information handling system 100. Here, though, the fan shroud 206 (illustrated in FIG. 2) has been removed to illustrate a bank of one or more cooling fans 300. Each one of the cooling fans 300 draws ambient air 302 from outside the cabinet 200. As the reader may understand, when the internal componentry receives electrical power and/or operates, the internal componentry generates waste heat. Each cooling fan 300 thus pushes the ambient air 302 across the internal componentry for a convective cooling affect. The cooling ambient air 302, for example, flows through the base 220 to cool the various peripheral cards 210 installed within the chassis 200.

Figure 14:
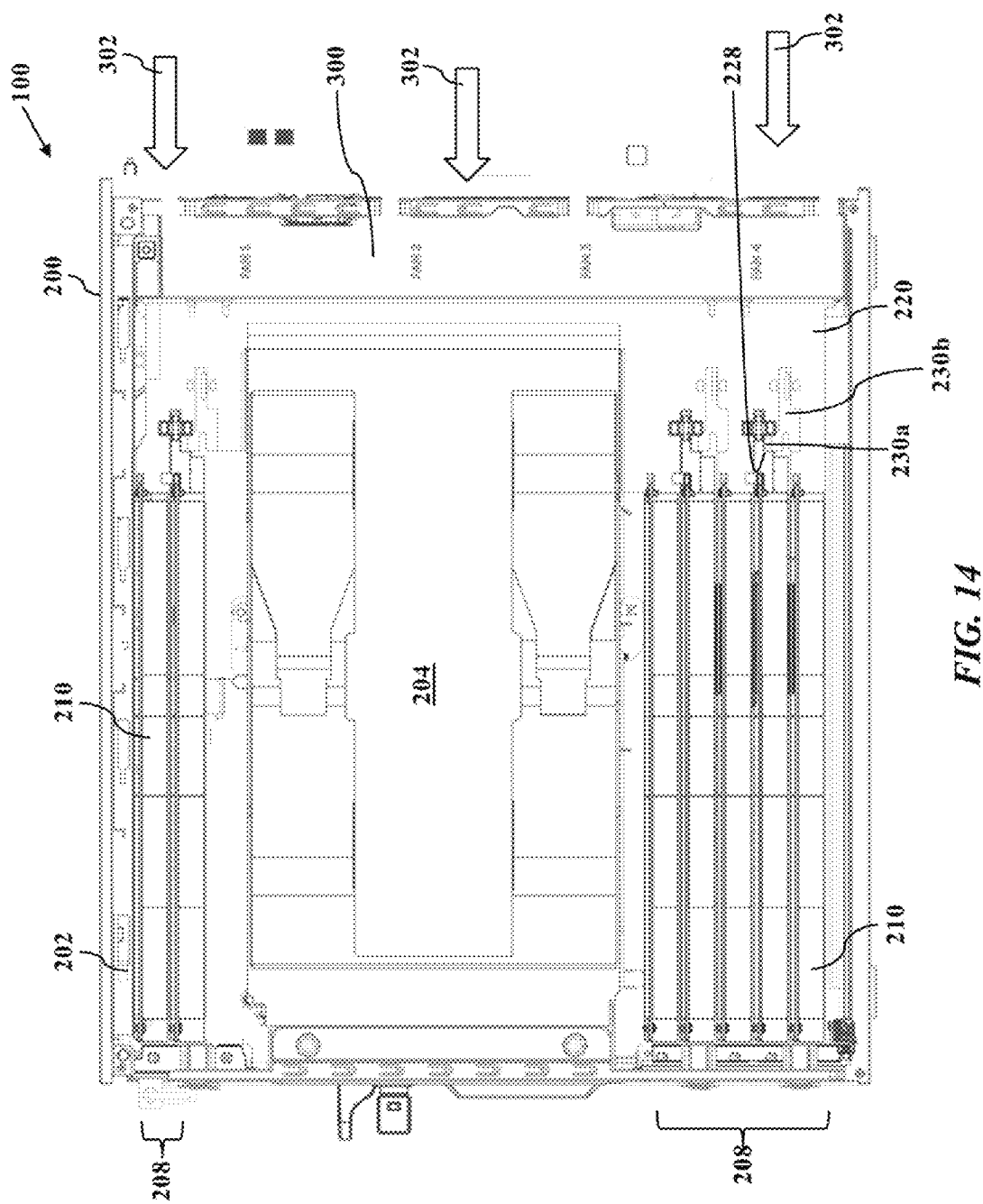
FIGS. 14-17 illustrate cooling enhancements, according to exemplary embodiments.
Figure 15:
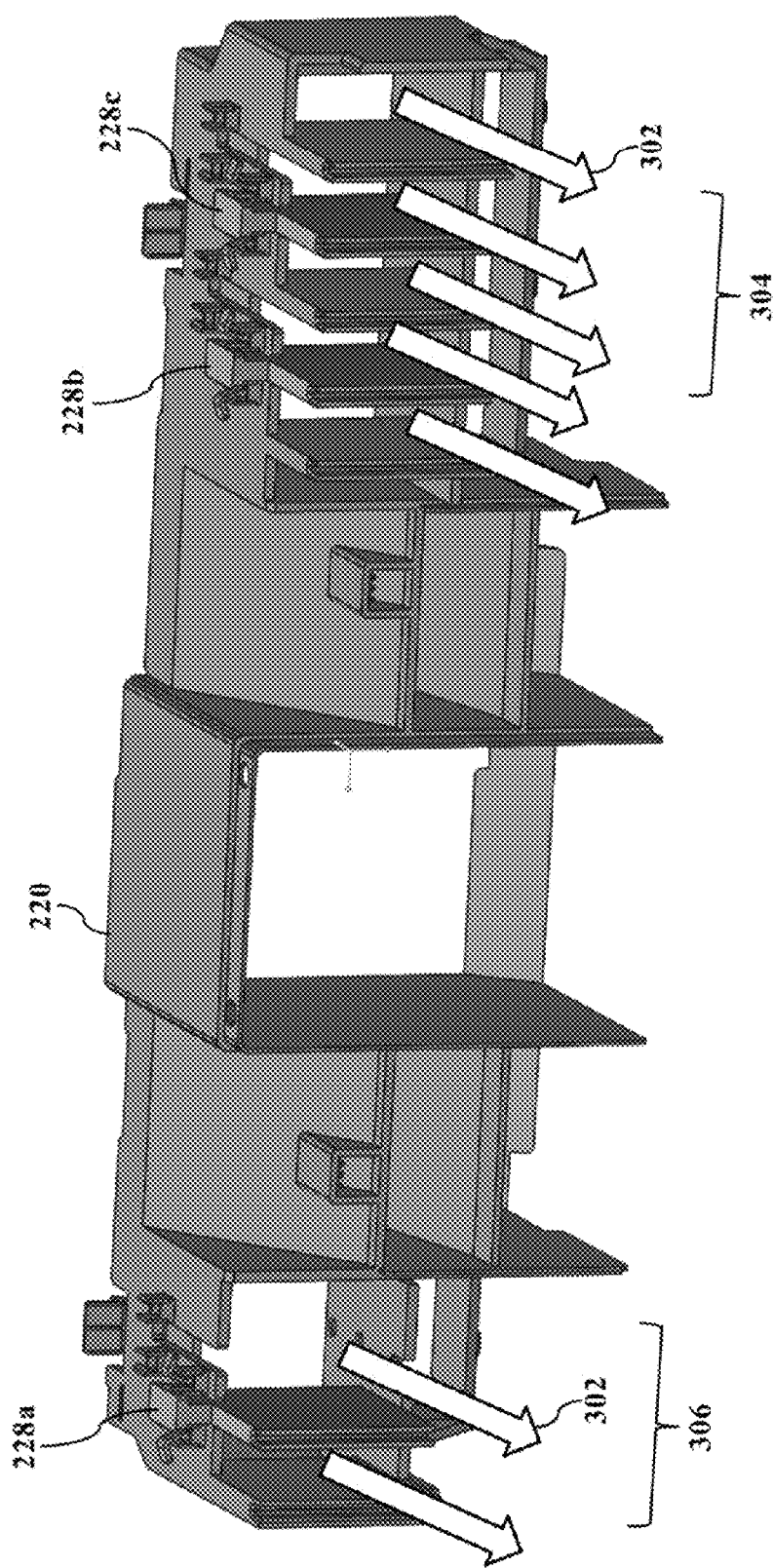

FIG. 15 again illustrates the base 220. The base 220 has several ducts or passageways that direct the cooling ambient air 302 to various internal components and/or areas within the cabinet 200 (illustrated in FIG. 14). For the purposes of this disclosure, the base 220 has a lower (or right) side card vent 304 and an upper (or left) side card vent 306. Each vent 304 and 306 is in air flow communication with the cooling fan 300 (as FIG. 14 illustrated). The cooling fan 300 forces the ambient air 302 to flow through the respective vent 304 and 306 to convectively cool the corresponding peripheral cards 210 (again, as FIG. 14 illustrated). Here, though, the various inserts (such as 228a, 228b, and 228c) substantially reduce resistance and turbulence of the cooling ambient air 320. That is, the generally rectangular and planar cross-sectional shape of the insert 228 allows greater air flow for the same capacity or size fan 300. The peripheral cards 210 operate cooler, thus reducing their susceptibility to temperature and performance degradation. Moreover, the increased airflow also allows the cooling fan 300 to operate with less noise, less vibration, and less electricity consumption, thus reducing operating costs and improving customer satisfaction.

Figure 16:
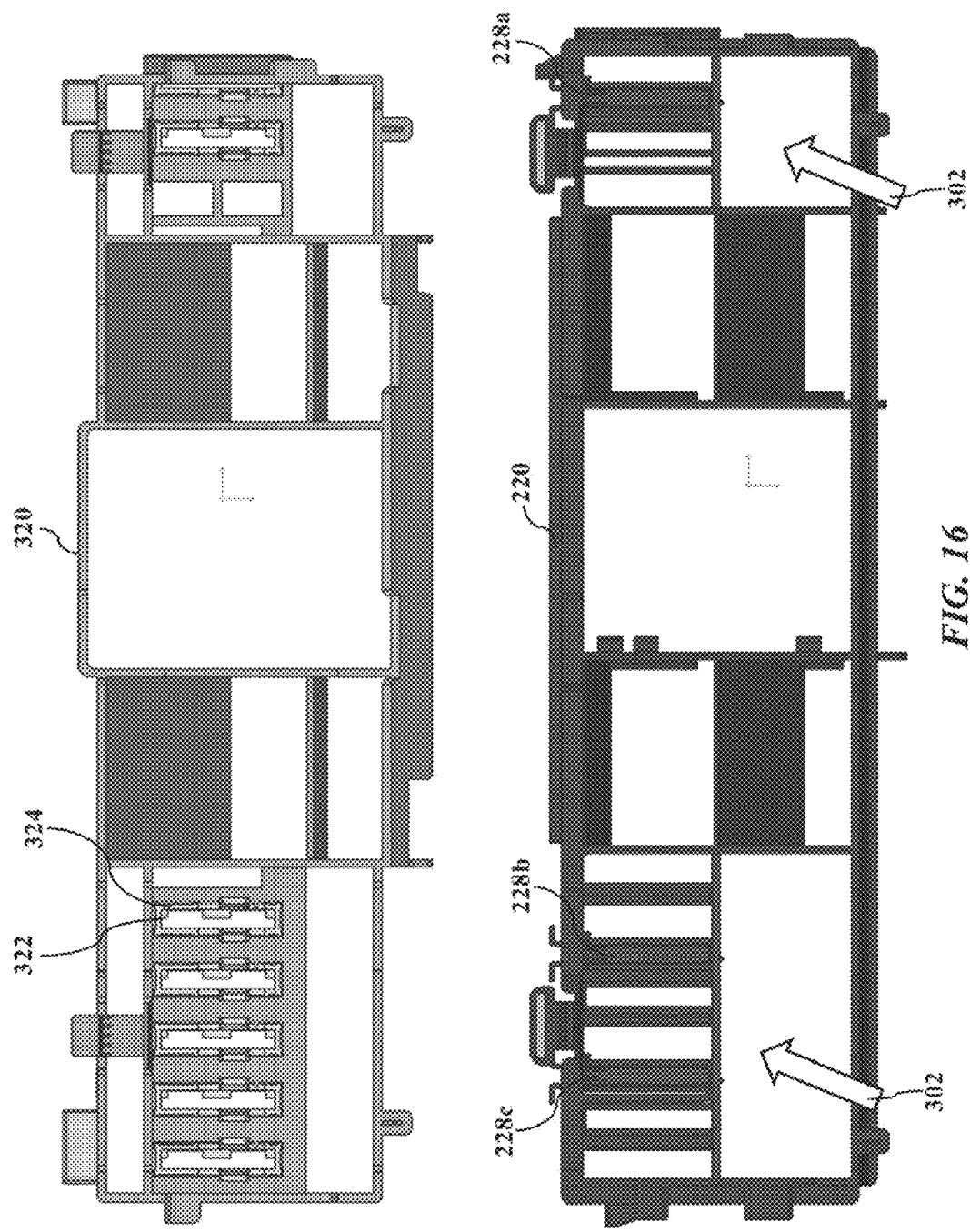

FIG. 16 dramatically illustrates the cooling improvements. FIG. 16 illustrates a conventional base 320 having a conventional static retention system. A static bracket 322 retains each peripheral card (not shown for simplicity). That is, the bracket 322 snaps inserts into the conventional base 320 to retain a single configuration of peripheral cards. The conventional bracket 322, though, has a cross-sectional shape 324 that impedes airflow, thus creating turbulent airflow and excessive noise in the fan. FIG. 16, though, also illustrates the base 220 having the inserts 228a, 228b, and 228c deployed therein. The slim, rectangular cross-section of the insert 228 allows a larger cross-section flow area for the ambient air 302. That is, more air 302 flows across the inserts 228, thus improving the convective cooling effect for the peripheral cards 210. The peripheral cards 210 simply thus perform. Indeed, the overall internal temperature within the cabinet (illustrated as reference numeral 200 in FIGS. 2 and 14) may also be reduced, simply due to the improved airflow. Moreover, the increased airflow across the inserts 228 also allows the cooling fan (illustrated as reference numeral 300 in FIG. 14) to operate with less noise, less vibration, and less electricity consumption, thus reducing operating costs and improving customer satisfaction.

Figure 17:
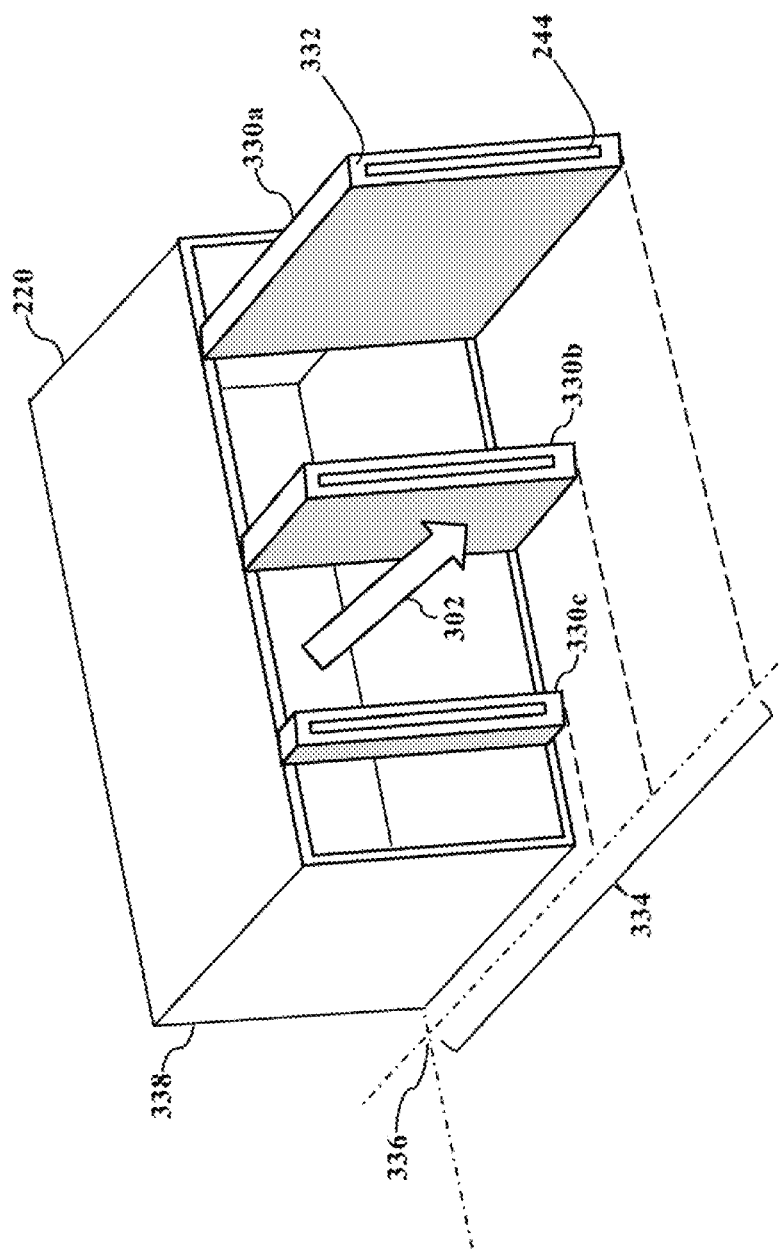

FIG. 17 illustrates another retention mechanism, according to exemplary embodiments. Here the base 220 may different vanes 330 that are preconfigured for the different designs and configurations of the peripheral card 210. A first vane 330a, for example, outwardly extends from the base 220. An outer face 332 includes the channel 244 for accepting the edge 226 of the corresponding peripheral card 210 (as FIG. 3 best illustrated). The first vane 330a, though, has an extension length 334 that is predetermined to match or fit the length, width, or other position of the corresponding peripheral card 210. FIG. 17 illustrates the extension length 334 measure from a reference position 336 (such as an edge 338 of the base 220). Additional vanes 330b and 330c may also extend from the base 220, with each additional vane 330b and 330c perhaps having a different extension length 334. Again, because the vanes 330 have a slim, rectangular cross-section, more and calmer air 302 flows for better cooling and quieter operation.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system, comprising: a processor; a peripheral card operatively coupled to the processor and having a printed circuit board; and a base retaining an edge of the peripheral card, the base having different notches according to a length of the peripheral card, the different notches having different depths within the base from a common edge of the base, the edge of the peripheral card inserting into one of the different notches having a depth that aligns with the length of the peripheral card.

2. The information handling system of claim 1, further comprising a fan for convecting air to cool the peripheral card.

3. The information handling system of claim 1, further comprising an air duct in the base, the air duct directing the air from the fan to the peripheral card.

4. The information handling system of claim 1, further comprising a bracket retaining an opposite edge of the peripheral card.

5. An information handling system, comprising:
a processor;
a memory device operatively coupled to the processor;
a peripheral card having a printed circuit board;
a connection between the processor and the peripheral card;
a base having two different notches as different installation positions for the peripheral card, the two different notches having different depths within the base from a common edge of the base; and
an insert having a channel that retains an edge of the peripheral card, the insert inserted into one of the two different notches within the base that corresponds to a length of the peripheral card, the insert installed in one of the different installation positions to accommodate the length of the peripheral card.

6. The information handling system of claim 5, further comprising a fan for moving air to cool the peripheral card.

7. The information handling system of claim 6, further comprising an air duct in the base, the air duct directing the air from the fan to the peripheral card.

8. The information handling system of claim 6, further comprising an air duct in the base, the air duct directing the air along the insert to the peripheral card.

9. The information handling system of claim 5, further comprising a bracket retaining an opposite edge of the peripheral card.

10. The information handling system of claim 5, further comprising a grasp tab extending from the insert, the grasp tab for removing the insert from the one of the two different notches.

11. The information handling system of claim 5, further comprising a pinch tab extending from the insert, the pinch tab engagingly locking the insert in the one of the two different notches.

12. The information handling system of claim 5, further comprising a pair of pinch tabs extending from the insert, the pair of pinch tabs engagingly locking the insert in the one of the two different notches.

13. An information handling system, comprising:
a processor;
a memory device operatively coupled to the processor;
a peripheral component interconnect card having a printed circuit board;
a peripheral component interconnect bus connecting the processor and the peripheral component interconnect card;
a base having two different notches, formed within an air duct the two different notches offset from each other in two different planes, a first notch of the two different notches having a first depth along a first plane of the two different planes, a second notch of the two different notches having a second depth along a second plane of the two different planes, the two different notches and the two different planes configured as a different installation positions according to a length of the peripheral component interconnect card; and
an insert installed in one of the two different notches to accommodate the length of the peripheral component interconnect card, the insert having a channel that retains an edge of the peripheral component interconnect card, the insert aligning a longitudinal axis of the peripheral component interconnect card along one of the two different planes.

14. The information handling system of claim 13, further comprising a fan for moving air through the air duct to cool the peripheral component interconnect card.

15. The information handling system of claim 13, further comprising a bracket retaining an opposite edge of the peripheral component interconnect card.

16. The information handling system of claim 13, further comprising a grasp tab extending from the insert, the grasp tab for removing the insert from the one of the two different notches.

17. The information handling system of claim 13, further comprising a pinch tab extending from the insert, the pinch tab engagingly locking the insert in the one of the two different notches.

18. The information handling system of claim 13, further comprising a pair of pinch tabs extending from the insert, the pair of pinch tabs engagingly locking the insert in the one of the two different notches.

\* \* \* \* \*